United States Patent
Furuta

[19]
[11] Patent Number: 5,857,081
[45] Date of Patent: Jan. 5, 1999

[54] METHOD AND APPARATUS FOR CONTROLLING A MASTER ABORT IN A COMPUTER SYSTEM

[75] Inventor: Shinichi Furuta, Tokyo, Japan

[73] Assignee: Kabushiki Kaisha Toshiba, Kawasaki, Japan

[21] Appl. No.: 706,351

[22] Filed: Aug. 30, 1996

[30] Foreign Application Priority Data

Sep. 8, 1995 [JP] Japan ..................................... 7-231616

[51] Int. Cl.⁶ .................................................. G06F 13/00
[52] U.S. Cl. ........................ 395/308; 395/306; 395/308; 395/290; 395/293
[58] Field of Search .................................. 395/309, 308, 395/306, 280, 283, 281, 288, 293, 287, 290, 729

[56] References Cited

U.S. PATENT DOCUMENTS 5,559,968  9/1996  Stancil et al. ............................. 395/306
5,632,021  5/1997  Jennings et al. ......................... 395/309

OTHER PUBLICATIONS

Intel Article, "Peripheral Components," pp. 3–33 through 3–50, (1993).
"Mobile PC/PCI DMA Arbitration and Protocols," Intel Corporation, Apr. 1996, Revision 2.2, pp. 1–27.
PCI Local Bus Specification, PCI Special Interest Group, Revision 2.1 (1995).
PCI Local Bus Specification, PCI Special Interest Group, Revision 2.0 (1995).

*Primary Examiner*—Meng-Ai T. An
*Assistant Examiner*—Rupal D. Dharia
*Attorney, Agent, or Firm*—Finnegan, Henderson, Farabow, Garrett & Dunner, L.L.P.

[57] ABSTRACT

While a PCI master on an external bus is executing a transaction on an internal PCI bus, if a bus access request signal (REQ#) output from a PCI device on the internal PCI bus, priority of which is higher than that of the PCI master, is asserted, a PCI bus arbiter deasserts a bus access enable signal (GNT#) corresponding to the PCI master. A request and grant manager informs the PCI master of GNT# by using a serial GNT# through an external PCI bus bridge connected to the internal PCI bus and the external PCI bus. Before the transaction executed by the PCI master ends, when the external PCI bus bridge recognizes that a device on the external PCI bus is a target specified by a transaction of the PCI device as a new bus master, it informs the PCI device of a target retry.

33 Claims, 6 Drawing Sheets

METHOD AND APPARATUS FOR CONTROLLING A MASTER ABORT IN A COMPUTER SYSTEM

FIELD OF THE INVENTION

This invention relates to computer systems, and, in particular, concerns a computer system with a bridge to couple a PCI bus and an extended bus.

BACKGROUND OF THE INVENTION

Standard system buses, such as ISA (Industry Standard Architecture) and EISA (Extended ISA) buses, are conventionally used in personal computers. Another standard bus, PCI (Peripheral Component Interconnect) bus, is commonly employed in desktop-type personal computers to increase the speed of data transfer and organize system architecture, independently of the kind of processors.

Substantially all data transfer using a PCI bus is block transfer, where each block is transferred by burst transmission. For example, data can be transferred at a transfer speed of 133 megabytes/sec. on a data bus having a width of 32 bits.

Therefore, when a PCI bus is used, data transfer between I/O devices and between a system memory and an I/O device is executed at high speed. As such, system performance is high.

Recently, PCI buses have been used not only in desktop-type personal computers, but also in portable personal computers, such as notebook-type computers.

In desktop type personal computers, option cards for function expansion, such as PCI expansion cards and ISA expansion cards, are directly mounted in an expansion slot on the system board. In such cases, a plurality of pairs of DMA request signal (DREQ) lines and DMA acknowledgment (DACK#) lines corresponding to a plurality of types of DMA channels are defined for each ISA expansion slot to which an ISA expansion card is connected (one pair of lines per slot). As a result, because each ISA expansion card uses a specific DMA channel corresponding to one combination of DREQ and DACK#, the DMA transfer function of a DMAC (direct memory access controller) core on the system board is executed.

Moreover, each PCI expansion slot to which the PCI expansion card is connected (one pair of lines per slot) defines a pair of arbitration control lines composed of a bus access request signal (REQ#) line and a bus access enable signal (GNT#) line. In this case, a PCI bus arbiter on the system board can arbitrate bus accesses of the PCI expansion cards as well as those of PCI devices on the system board.

Consequently, devices that do not require a DMA transfer function, such as PCI bus masters, and devices that do require a DMA transfer function, such as ISA devices, are easily combined in a desktop-type personal computer.

However, even in portable personal computers, it is necessary to mount option cards, such as PCI expansion cards and ISA expansion cards, via an expansion unit known as a desk station. In such a case, it is necessary to reduce as much as possible the number of signal lines leading out from the portable personal computer to the desk station. This is because an increased number of signal lines leading out to the desk station leads to an undesirable increase in the number of pins of the LSI circuit mounted on the system board for interfacing with the desk station, as well as an undesirable increase in the number of pins of the connector for connecting the portable personal computer and the desk station. These increases, in turn, result in an increase in the cost of the portable personal computer and reduction of system mounting efficiency.

As a result, computer systems are not commercially implemented with a plurality of pairs of DMA request signal (DREQ) lines and DMA acknowledgment (DACK#) lines and also a plurality of pairs of bus access request signal (REQ#) line and bus access enable signal (GNT#) lines leading out to the desk station. However, if control lines for DMA transfer are not provided to the desk station, option cards, such as ISA cards, cannot perform DMA transfers. Further the PCI expansion cards cannot serve as a bus master.

A computer system has been recently proposed that utilizes a protocol for transmitting and receiving DMA request signals (DREQ) and DMA acknowledgment (DACK#) signals between an ISA expansion card installed in the desk station and the DMAC core on the system board, and also for transmitting and receiving REQ# and GNT# between a PCI expansion card and the PCI bus arbiter, without using a plurality of pairs of DMA request signal (DREQ) lines and DMA acknowledgment (DACK#) lines and a plurality of pairs of bus access request signal (REQ#) lines and bus access enable signal (GNT#) line.

This protocol uses a pair of signals consisting of a bus access request signal (REQ#) and a bus access enable signal (GNT#) on a PCI bus, to recognize the transferring of DREQ and DACK# between an ISA expansion card and the DMAC core, and also the transferring of REQ# and GNT# between a PCI expansion card and the PCI bus arbiter. Thus, this protocol supports DMA requests (DREQs) for a plurality of channels and requests (REQs#) from PCI bus master in the pair of signals. Hereafter, REQ# and GNT# used for a serial transfer are designated serial REQ# and serial GNT#.

When the above-mentioned DMA serial channel protocol, which serially transfers a plurality of DMA requests and a plurality of PCI bus master requests in this way, is implemented in a bridge interface in the desk station to couple an external PCI bus and an external ISA bus, the bridge interface needs only signal lines corresponding to a PCI bus leading out to the desk station. Hence, it is possible to use both PCI expansion cards and ISA expansion cards.

However, the bridge within the desk station needs a process for serializing DMA request signals (DREQ) of a plurality of channels and PCI bus master request signals (REQs#), and a process for converting in parallel the serialized DREQ channel information transmitted by a serial transfer way in the DMAC core, and inputs the converted information to the ISA expansion cards and the PCI expansion cards in the desk station, with respect to the notification of the DMA acknowledge (DACK#) and the bus access enable signal (GNT#). Therefore, substantial time is required from generation of a DMA request signal (DREQ) and a PCI bus master request signal (REQ#) from the ISA and PCI expansion cards to reception of the DMA request signal and the PCI bus master request signal by the DMAC core and the PCI bus arbiter.

Similarly, the DMAC core needs a process for serializing DACK# signals of a plurality of channels and GNT# signals transmitted by a serial transfer way, and a process for converting in parallel the serialized information transmitted by a serial transfer way to two or more DACK# signals and GNT# signals, and inputs the converted information to the DMAC core and the PCI bus arbiter, with regard to notification of DMA request signals (DREQ) and PCI bus master request signals (REQ#). Therefore, similarly, substantial time is required from generation of a DMA acknowledgment signal (DACK#) and a PCI bus access enable signal (GNT#) from the DMAC core and the PCI bus arbiter to reception of the DMA request signal and the PCI bus master request signal by the ISA and PCI expansion cards, respectively.

The time lag in such serial transfer causes various problems. This is illustrated by the foregoing description of a conventional mechanism receiving transactions from two bus masters that collide due to the transmission delay of the bus access enable signal (GNT#).

(1) A PCI expansion card on an external PCI bus asserts a bus access request signal (REQ#) to request the PCI bus access on an internal PCI bus.

(2) If a bridge in a desk station, coupled to the internal PCI bus and the external PCI bus, receives the REQ#, the bridge transfers the REQ# to a PCI bus arbiter on a system board in a serial transfer way.

(3) The PCI bus arbiter transfers a bus access enable signal (GNT#) corresponding to the bus access request signal (REQ#) to the bridge in a serial transfer way, based on the result of the bus arbitration.

(4) The bridge accesses GNT# out of serial information transferred in a serial transfer way, and transmits it to the PCI expansion card, which is requesting the PCI bus access on the internal PCI bus.

(5) After the PCI expansion card receives GNT# from the bridge, it serves as a bus master to begin the transaction.

(6) When a PCI device on the internal PCI bus, the priority of which is higher than that of the PCI expansion card, asserts a bus access request signal (REQ#) during the execution period of the transaction, the PCI bus arbiter deasserts the bus access enable signal (GNT#) of the PCI expansion card, and transmits it to the bridge in a serial transfer way. The PCI bus arbiter asserts a bus access enable signal (GNT#) of the PCI device with high priority active.

(7) The bridge accesses the information that shows inactive GNT# from serial information transferred in a serial transfer way, and transmits it to the PCI expansion card. When the PCI expansion card recognizes that the GNT# is deasserted, it processes a present cycle of the transaction as the final cycle.

(8) On the other hand, the PCI device on the internal PCI bus, the GNT# of which a PCI device is asserted, begins the operation as a bus master. At this time, if the access of the PCI device is a target on the external PCI bus, the transaction executed by the PCI device is sent to the external PCI bus by way of the bridge.

(9) As mentioned above, the serial transfer of GNT# requires a lot time for a delay by the processing of the parallel-serial conversion and the serial-parallel conversion. Hence, the transaction of the PCI device on the internal PCI bus is transmitted to the external PCI bus by way of the bridge before the PCI expansion card ends the operation as a bus master.

(10) In this case, there is a collision between the transaction executed by the PCI expansion card and the transaction executed by a PCI device of which GNT# is newly asserted. The bridge cannot respond to the transaction from the PCI device of which GNT# is newly asserted until the transaction of the PCI expansion card ends. Therefore, the PCI device that began the transaction determines that there is not a target on the external PCI bus. This causes a master abort. If a master abort occurs at this time, the same transaction executed by the PCI device is not reexecuted.

Therefore, the conventional computer system, to which the DMA serial channel protocol is applied, contains a delay in the GNT# transmission to the PCI expansion card. Thus, the situation results in the transactions colliding.

SUMMARY OF THE INVENTION

One object of this invention is to prevent malfunction due to the collision of transactions.

Another object of this invention is to achieve a DMA serial channel protocol with high reliability to improve a bridge to connect an internal bus and an external bus.

In accordance with the present invention, the foregoing objects, among others, are achieved by providing a computer system comprising a first PCI bus; a bus arbiter (PBA) for arbitrating bus accesses by using a pair of a bus access request signal (REQ#) and a bus access enable signal (GNT#) allocated into each bus agent in the first PCI bus; a second PCI bus a bridge, connected to the first PCI bus and the second PCI bus, for transmitting a bus access request signal (REQ#) from a PCI expansion device on the second PCI bus to the bus arbiter; a circuit for receiving a bus access enable signal (GNT#) from the bus arbiter to allow the PCI expansion device to access the first PCI bus; and a circuit, connected to the bridge, for notifying a target retry to a PCI device on the first PCI bus, when a PCI expansion device on the second PCI bus was specified as a target by the transaction of the PCI device on the first PCI bus.

There has also been provided, in accordance with a aspect of the present invention, another method of preventing a master abort from occurring erroneously in a computer system having a first PCI bus, a second PCI bus, and a bus arbiter (PBA) for arbitrating bus accesses by using a pair of a bus access request signal (REQ#) and a bus access enable signal (GNT#) allocated into each bus agent in the first PCI bus. The method comprises the steps of transmitting a bus access request signal (REQ#) from a PCI expansion device on the second PCI bus to the bus arbiter through a bridge connected to the first PCI bus and the second PCI bus, receiving a bus access enable signal (GNT#) from the bus arbiter to allow the PCI expansion device to access a target on the first PCI bus, transmitting a bus access request signal (REQ#) from a PCI device on the first PCI bus to the bus arbiter, deactivating the bus access enable signal (GNT#) granted to the PCI expansion device on the second PCI bus, when a priority of the PCI device is higher than that of the PCI expansion device, receiving a bus access enable signal (GNT#) from the bus arbiter to the PCI device, and notifying a target retry from the bridge to the PCI device on the first PCI bus, when a PCI expansion device on the second PCI bus was specified as a target by a transaction of the PCI device.

In one embodiment of this invention, since the external PCI bridge (EPBB) informs a bus master on the internal PCI bus of a target retry before a PCI master such as a PCI expansion device ends a bus cycle as a bus master, even if the bus master on the internal PCI bus, to which PCI bus access is newly allowed, executes the transaction, by which a PCI device on the external PCI bus is specified as a target, a master abort can be prevented from being generated erroneously. Thus, the DMA serial channel protocol with high reliability can be achieved.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
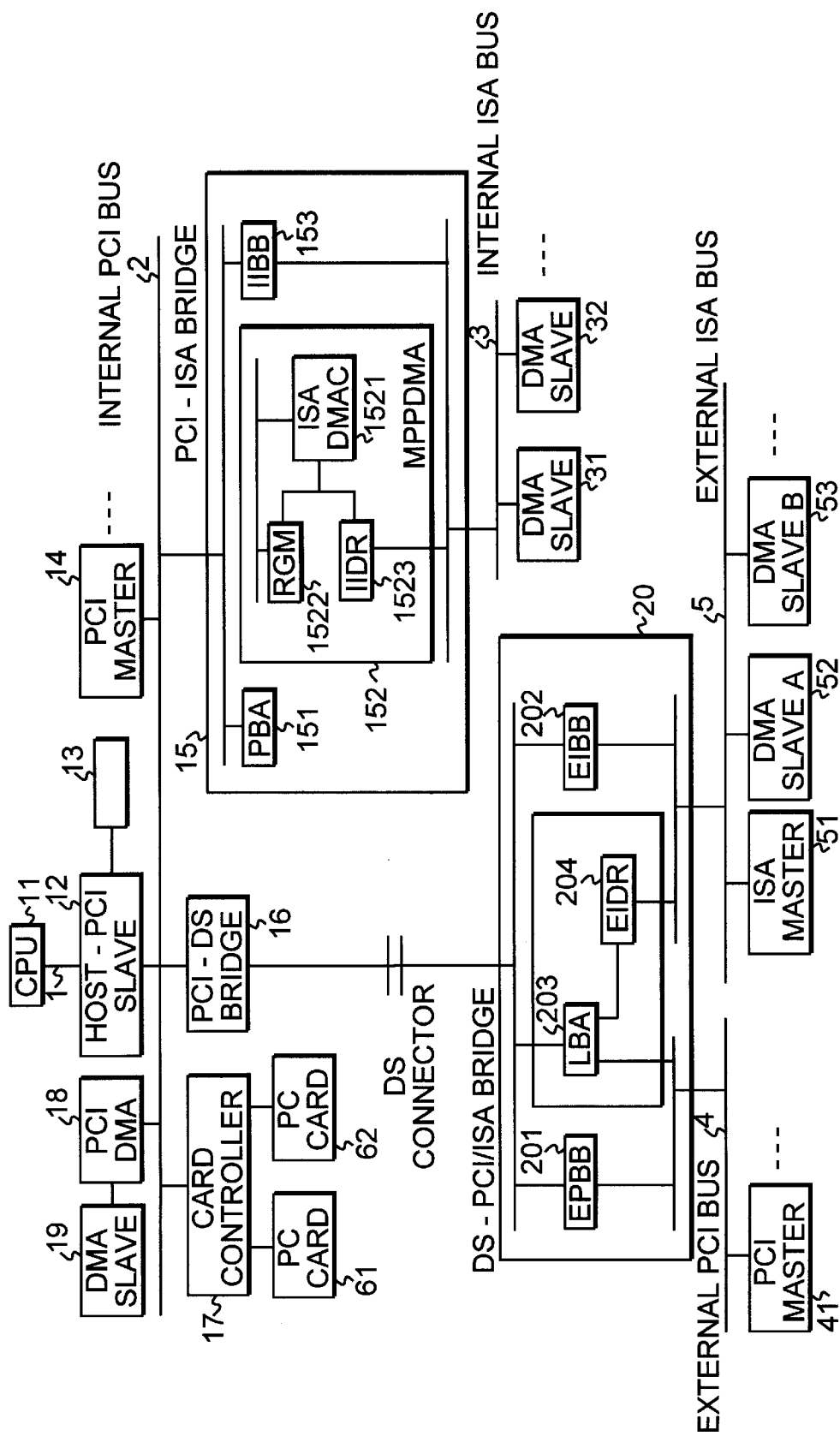
FIG. 1 is a block diagram of a portable computer system in accordance with one embodiment of this invention.

FIG. 1 shows the structure of a computer system, according to one embodiment of this invention. This computer system is preferably a notebook type or laptop type portable computer. As shown in FIG. 1, three types of buses, i.e. processor bus 1, internal PCI bus 2 and internal ISA bus 3, are arranged on a system board. External PCI bus 4 and external ISA bus 5 are arranged in a desk station connected to a DS connector of the portable personal computer.

The system board includes CPU 11, Host-PCI bridge 12, system memory 13, various types of PCI master devices 14, internal PCI-ISA bridge 15, PCI-DS (DS: desk station) bridge 16, PC card controller 17, and PCI DMA 18. The desk station includes DS-PCI/ISA bridge 20.

CPU 11 is preferably a "Pentium" microprocessor produced and marketed by the Intel Company. Processor bus 1 can be directly connected to input/output pins of CPU 11 and preferably has a 64-bit data bus.

System memory 13 is a memory device for storing an operating system, device drivers, application programs to be executed, and data for processing. Memory 13 is preferably formed by a plurality of DRAMs. System memory 13 is connected to host/PCI bridge 12 via a memory bus having a 32-bit or 64-bit data bus. Processor bus 1 serves as a data bus for the memory bus. In such a case, the memory bus is formed by an address bus and various types of memory control signal lines.

Host-PCI bridge 12 is a bridge LSI for coupling processor bus 1 and internal PCI bus 2, and functions as one bus master of a PCI bus. Host-PCI bridge 12 can directionally convert bus cycles including data and addresses between processor bus 1 and internal PCI bus 2, can control access of system memory 13 via a memory bus, and can provide a locking function for exclusively using system memory 13. This locking function is served by the bus master and CPU 11, etc. on internal PCI bus 2. Also, Host-PCI bridge 12 includes a buffer (not shown) for synchronizing the bus cycles of processor bus 1 and internal PCI bus 2.

Internal PCI bus 2 is preferably a clock-synchronization type input/output bus. All cycles on internal PCI bus 2 are synchronized with a PCI bus clock. Clock speed of internal PCI bus 2 is preferably no greater than 33 MHz. Internal PCI bus 2 has an address/data bus used in a time division manner. In a preferred embodiment, this address/data bus has a width of 32 bits.

A data transfer cycle on internal PCI bus 2 is formed from an address phase followed by one or more data phases. An address and transfer type are output in the address phase. 8-bit, 16-bit, 24-bit or 32-bit data are output during the data phases.

Along with Host-PCI bridge 12, PCI master device 14 is one bus master of internal PCI bus 2, and operates as an initiator or target. All devices on internal PCI bus 2 serve as targets even if they do not serve as bus masters. The term "target" means the resource whose address is specified by an initiator, preferably a bus master, that began a transaction. In a preferred embodiment, PCI master 14 is a graphics controller.

Internal PCI-ISA bridge 15 is a bridge LSI for coupling internal PCI bus 2 and internal ISA bus 3. A memory and a plurality of ISA I/O devices 31, 32 are connected to internal ISA bus 3. I/O devices 31, 32, referred to as DMA slaves, are devices for requesting DMA transfer to a DMAC incorporated in internal PCI-ISA bridge 15. PCI bus arbiter (PBA) 151, DMAC core (MPPDMA) 152, and internal ISA bus bridge (IIBB) 153 are incorporated in internal PCI-ISA bridge 15.

PCI bus arbiter (PBA) 151 arbitrates bus accesses between all bus master devices connected to internal PCI bus 2. In this arbitration, signal lines (a bus request signal REQ# line and a bus access enable signal GNT# line) on internal PCI bus 2 are allocated in one pair to each bus master device.

A bus request signal REQ# is a signal for notifying PCI bus arbiter (PBA) 151 of a request from a device to use internal PCI bus 2. A bus access enable signal GNT# is a signal for notifying the device issuing the bus request signal REQ# that it has access to internal PCI bus 2.

Also, in this system, among the plurality of groups of REQ# and GNT# lines defined on internal PCI bus 2, one REQ# and GNT# line group allocated to DS-PCI/ISA bridge 20 is used for transmission and reception of DREQs and DACK#s between DMA slaves connected to external ISA bus 5, and for transmission and reception of REQ#s and GNT#s between PCI expansion cards connected to external PCI bus 4.

All of the bus request signal REQ# lines and bus access enable signal GNT# lines on internal PCI bus 2 are connected to PCI bus arbiter (PBA) 151, which controls arbitration of bus access right on internal PCI bus 2, based on the programmable priority of arbitration to each REQ# inputs. Even if REQ# from a bus master A, to whom GNT# was given, is still in an active state, when REQ# from a bus master B with high priority becomes active, a bus access right switches from bus master A to bus master B with high priority.

DMAC core (MPPDMA) 152 is formed from the three blocks of ISA DMAC 1521, bus request and grant manager (RGM: REQ#, GNT# manager) 1522, and internal ISA DMA router (IIDR) 1523. DMAC core (MPPDMA) 152 is preferably an independent function block within internal PCI-ISA bridge 15. In a preferred embodiment, only other blocks operate functions other than DMA, DMAC core (MPPDMA) 152 not being used.

Figure 2:
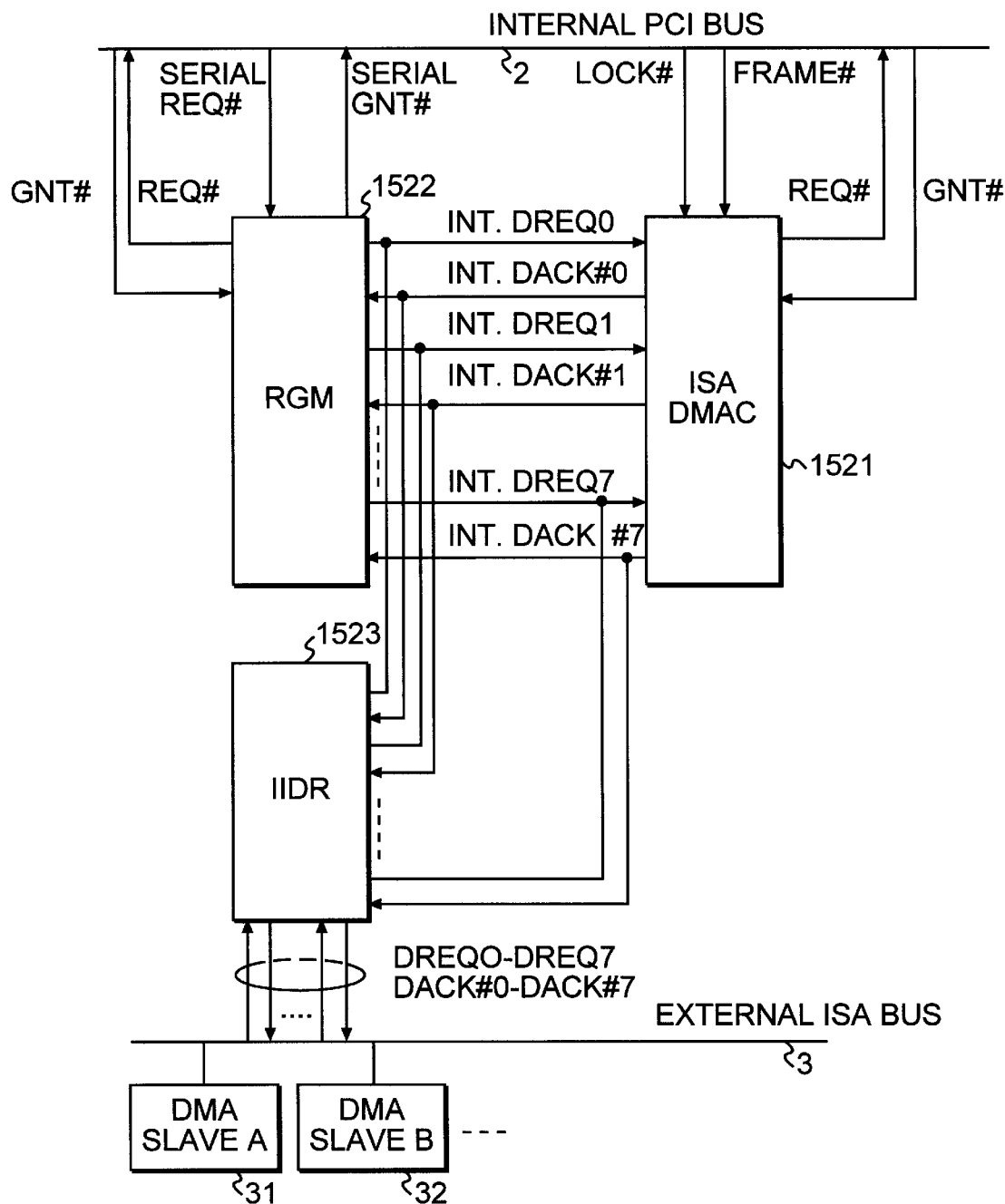
FIG. 2 is a block diagram showing the components of a DMAC core in the system shown in FIG. 1.

FIG. 2 shows the specific connections of ISA DMAC 1521, request and grant manager (RGM) 1522, and internal ISA DMA router (IIDR) 1523.

ISA DMAC 1521 is connected to internal PCI bus 2, and executes DMA transfer, according to a request from a DMA slave device requiring DMA transfer.

DMA slaves are logically connected to internal PCI bus 2. In most cases, they are connected to internal ISA bus 3 or external ISA bus 5 through PCI-ISA bridge 15 or DS-PCI/ISA bridge 20, respectively.

ISA DMAC 1521 has a DREQ input port where internal DREQs 0 to 7 are input and a DACK# output port for outputting internal DACK#s 0 to 7. Both the DREQ input ports and the DACK# output ports are connected to RGM 1522 and IIDR 1523, respectively. Transmission and reception of DREQs and DACK#s between the DMA slaves 31, 32 and ISA DMAC 1521 on internal ISA bus 3 are executed via IIDR 1523. Also, transmission and reception of DREQs and DACK#s between ISA master 51 and DMA slaves 52, 53 on external ISA bus 5 and ISA DMAC 1521 are performed by DMA serial channel protocol via RGM 1522.

Since ISA DMAC 1521 is connected to internal PCI bus 2 and devices requesting DMA transfer are connected to internal ISA bus 3 or external ISA bus 5, ISA DMAC 1521 does not generate a read cycle (I/O read or memory read) and a write cycle (memory write or I/O write) simultaneously in DMA transfer. That is, a read cycle is performed, followed by the read data being latched to a buffer in ISA DMAC 1521. Next, a write cycle is executed and the previously latched data are output as write data.

ISA DMAC 1521 generates both a read cycle and a write cycle on internal PCI bus 2, irrespective of whether they are memory or I/O. Further, PCI-ISA bridge 15 or DS-PCI/ISA bridge 20 converts a bus cycle on internal PCI bus 2 to an ISA bus cycle. Namely, ISA DMAC 1521 generates both memory cycles and DMA exclusive I/O cycles on internal PCI bus 2 and is not concerned with ISA bus cycles.

ISA DMAC 1521 has preferably one 82C37 compatible function, which is the ISA bus system architecture standard, and supports DMA channels CH0 to CH7 by means of internal DREQs 0 to 7 and internal DACK#s 0 to 7. Among these channels, because DMA channel CH4 is used to cascade-connect two DMAC controllers, it is not used for DMA transfer. As a result, DREQ4 and DACK#4 among the internal DREQs 0 to 7 and internal DACK#s 0 to 7 are actually not connected to either RGM 1522 or IIDR 1523.

ISA DMAC 1521 performs arbitration of DMA channels by using the internal DREQs 0 to 7 and internal DACK#s 0 to 7 prepared in one pair each for every DMA channel. An internal DREQ is a DMA request signal used to notify ISA DMAC 1521 that a DMA slave is requesting execution of DMA transfer. A DACK# is a DMA acknowledgment signal by which ISA DMAC 1521 notifies commencement of DMA cycle execution of a DMA slave which has requested DMA transfer. The DMA slave, which is the subject of DMA transfer, is selected by this DACK#.

Allocation of the DMA channels is exclusively performed between devices on internal ISA bus 3 and devices on external ISA bus 5. Each device transmits to and receives from ISA DMAC 1521 the DREQ and DACK# corresponding to the DMA channel allocated thereto.

In this case, transmission and reception of the DREQ and DACK# between external ISA bus 5 and ISA DMAC 1521, as described above, are executed according to the DMA serial channel protocol by using one group of serial REQ# and serial GNT# signal lines.

The DMA serial channel protocol can decrease the number of signal lines that should be derived to the desk station, and use both a PCI expansion card and an ISA expansion card in the desk station.

In this DMA serial channel protocol, DS-PCI/ISA bridge 20 transmits the most recent DREQ state into RGM 1522 by using a serial REQ#. RGM 1522 converts the serial REQ# to internal DREQs 0 to 7 for ISA DMAC 1521.

Further, RGM 1522 transmits channel information of DMA transfer indicated by the internal DACK#s 0 to 7 output from ISA DMAC 1521 to DS-PCI/ISA bridge 20 by a serial transfer using the serial GNT# signal line.

ISA DMAC 1521 preferably performs 82C37 compatible arbitration between DREQ channels, according to setting and adjustment of a DREQ channel mask, based on the most recent DREQ channel information provided from RGM 1522 and IIDR 1523. If there is an effective DMA request (DREQ), ISA DMAC 1521 asserts a REQ# allocated to itself, and sends a request for bus access right to PBA 151, and waits for a GNT# to be granted by PBA 151.

When PBA 151 provides GNT# to ISA DMAC 1521, ISA DMAC 1521 makes an active internal DACK# corresponding to the DMA channel number selected on the result of arbitration. ISA DMAC 1521 returns the DMA channel number for the DMA transfer to RGM 1522 and IIDR 1523. ISA DMAC 1521 asserts FRAME# and executes a DMA cycle corresponding to a DMA transfer mode regulated by setup information of a selected DMA channel. That is, single transfer mode, block transfer mode, demand transfer mode, and cascade mode. In this case, ISA DMAC 1521 supports only bus cycles on the PCI bus for memory cycles and I/O cycles. Bus cycles on the ISA bus are emulated by PCI-ISA bridge 15 and DS-PCI/ISA bridge 20.

RGM 1522 serializes the plurality of DMA channels and manages the states of the serial REQ# and the serial GNT# in order to perform processes relating to the DMA serial channel protocol which is to transfer. RGM 1522 performs conversion between the DMA serial channel protocol and the DREQ/DACK# protocol of the ISA style regarding ISA DMAC 1521.

RGM 1522 has REQ# signals. Also, the protocol of the REQ# is programmed for each REQ# signal. Consequently, if a number of pairs of REQ# and GNT# signal lines used as serial REQ#s and serial GNT#s, respectively, are prepared, DMA serial channel protocol is used to receive and transmit DREQs and DACK#s between not only devices on external ISA bus 5, which are performed through DS-PCI/ISA bridge 20, but also PC cards 61 and 62 of the PC card controller and ISA DMAC 1521.

RGM 1522 converts between DMA serial channel protocol and REQ#/GNT protocol for arbitration of the standard PCI style supported by PBA 151. This is described in "PCI Local Bus Specification" written by PCI Special Interest Group and dated Jun. 1, 1995, the content of which is hereby incorporated by reference.

In other words, the DMA serial channel protocol is used to receive and transmit not only DREQs and DACK#s with devices on external ISA bus 5, but also REQs and GNT#s with PCI expansion cards such as PCI masters on external PCI bus 4. Processing of the REQ#s and GNT#s in this case is performed in the following manner by RGM 1522.

PCI master 41, such as LAN board or SCSI board on external PCI bus 4, informs DS-PCI/ISA bridge 20 of a bus access request by asserting the REQ#. DS-PCI/ISA bridge 20 informs RGM 1522 of the bus access request by serial data transfer by using the serial REQ#. In such a case, notification of the bus access request uses DREQ 4 which is the DMA channel not used by ISA devices.

RGM 1522 converts in parallel the serial REQ# signal and, upon detecting that the DREQ 4 has been notified by the serial REQ#, asserts the REQ# and makes a request to PBA 151 for bus access. PBA 151 arbitrates based upon the standard PCI rule and enables bus access for RGM 1522 by means of a GNT# signal.

RGM 1522, upon receiving the GNT# from PBA 151, notifies DS-PCI/ISA bridge 20 by means of serial transfer data using a serial GNT# that bus access was enabled. In this case, DACK 4 is used in this notification. DS-PCI/ISA bridge 20 converts in parallel the serial GNT# signal transmitted by RGM 1522 and supplies the GNT# to PCI master 41. PCI master 41 commences a bus cycle upon receiving the GNT#.

Internal ISA DMA router (IIDR) 1523 changes a mapped DMA channel to the DMA slaves on internal ISA bus 3, according to programmed mapping information. IIDR 1523 converts the states of DREQ signals from the DMA slaves to internal DREQs corresponding to the DMA channel numbers of these devices, according to mapping information, and sends them to ISA DMAC 1521. Further, IIDR 1523 converts internal DACK#s from ISA DMAC 1521 to DACK#s, which are actually used by the DMA slaves, according to mapping information, and outputs them to internal ISA bus 3.

Internal ISA bus bridge (IIBB) 153 is a bridge LSI for connecting internal PCI bus 2 and internal ISA bus 3, and controls all devices on internal ISA bus 3, such as memories and I/Os. IIBB 153 protocol-converts memory or I/O cycles generated on internal PCI bus 2 for DMA transfer by ISA DMAC 1521, and sends them to internal ISA bus 3.

PCI-DS bridge 16 comprises a bridge LSI for connecting internal PCI bus 2 and a desk station bus corresponding to the PCI bus leading out to a desk station, and functions as an agent on internal PCI bus 2. Also, PCI-DS bridge 16 has a buffer (not shown) for synchronizing transfer of serial REQ#s/GNT#s by means of DMA serial channel protocol.

PC card controller 17 serves as one PCI bus master and supports DMA serial channel protocol. When PC cards 61, 62 controlled by PC card controller 17 request DMA transfer, the DMA request, i.e. DREQ, is transferred to RGM 1522 by the serial transfer which uses the REQ# signal line allocated to PC card controller 17. Further, a DACK# from RGM 1522 is sent to PC card controller 17 by the serial transfer, which uses the GNT# signal line allocated to PC card controller 17. PC card controller 17 decomposes the serial GNT# into a DACK# and passes them along to PC card 61 or 62.

PCI DMA 18 serves as an agent on internal PCI bus 2 similar to PC card controller 17 and supports DMA serial channel protocol. When DMA slave 19 controlled by PCI DMA 18 requests DMA transfer, this DMA request, i.e. DREQ, is transmitted to RGM 1522 by a serial REQ#. Also, PCI DMA 18 decomposes a serial GNT# from RGM 1522 into a DACK# and informs DMA slave 19 of them.

DS-PCI/ISA bridge 20 comprises a bridge LSI for connecting the desk station bus (corresponding to internal PCI bus 2), leading out to the desk station from the main body of the computer via the DS connector, to external PCI bus 4 and external ISA bus 5. DS-PCI/ISA bridge 20 serves as one PCI master similar to PC card controller 17 and supports DMA serial channel protocol.

Figure 3:
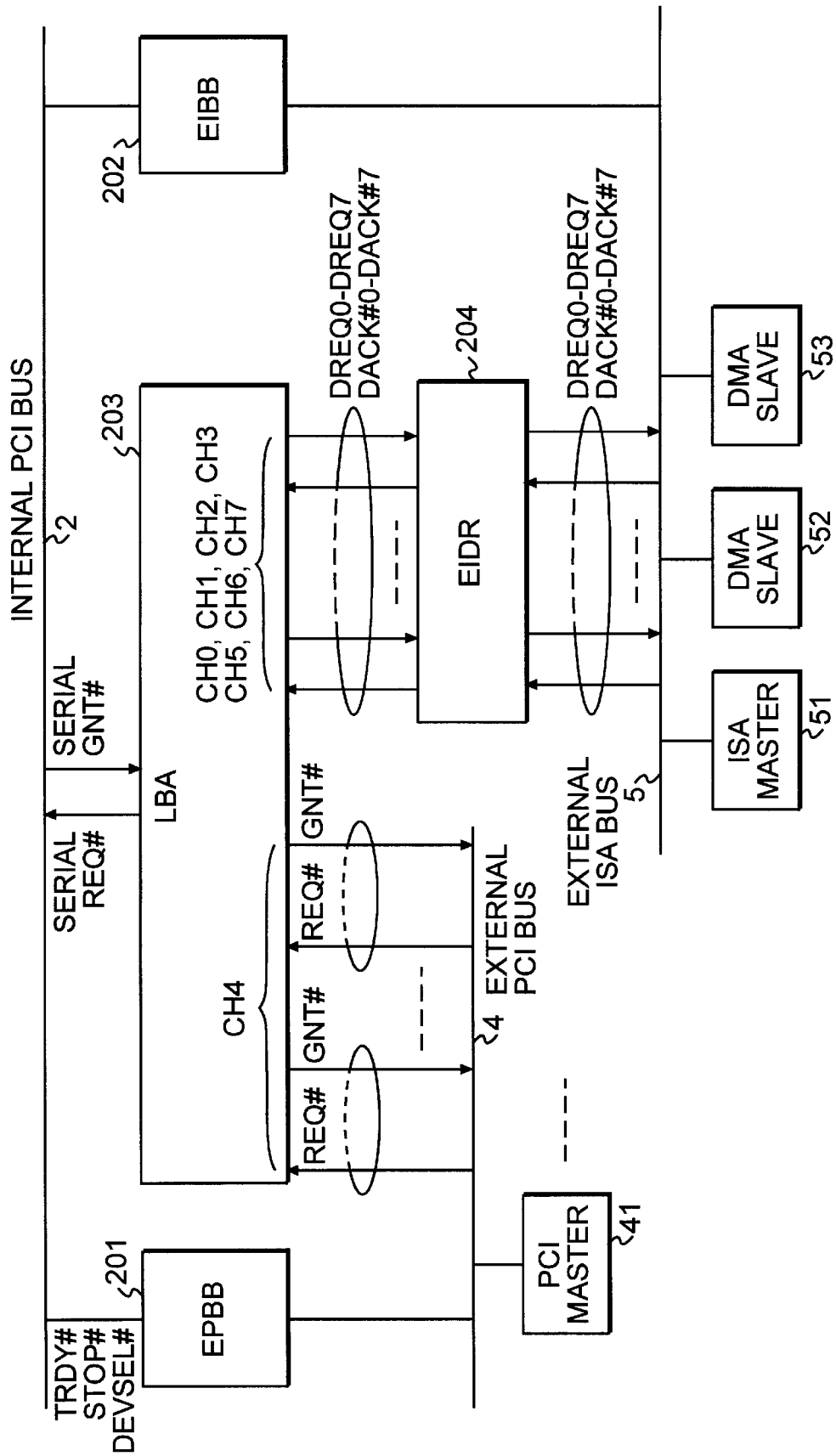
FIG. 3 is a block diagram showing a component of a DS-PCI/ISA bridge installed in the system of FIG. 1.

FIG. 3 shows the connections of external PCI bus bridge (EPBB) 201, external ISA bus bridge (EIBB) 202, local bus arbiter (LBA) 203, and external ISA DMA router (EIDR) 204 in DS-PCI/ISA bridge 20.

EPBB 201 receives through PCI-DS bridge 16 device memory cycles and I/O cycles generated by ISA DMAC 1521 on internal PCI bus 2, and sends them to external PCI bus 4. Further, where PBA 151 grants a bus access enable on internal PCI bus 2 to PCI master device 14 on external PCI bus 4, EPBB 201 generates external PCI bus transaction 4 on the desk station.

While PCI master 41 is executing a transaction as a bus master, when a PCI device on internal PCI bus 2 executes a transaction by which a device on external PCI bus 4 is specified as a target, EPBB 201 informs the PCI device on internal PCI bus 2 of a target retry to prevent the generation of a master abort.

In the conventional computer system, the transmission and reception of a bus access request signal REQ# and a bus access enable signal GNT#, respectively, between PCI master 41 and PBA 151 uses the serial channel protocol as mentioned above. If REQ# is asserted by other bus masters (for example, Host-PCI bridge 16 on internal PCI bus 2) whose priority of arbitration is higher than the priority of PCI master 41 with GNT# being allowed to access internal PCI bus 2, PBA 151 deasserts the GNT# corresponding to the PCI master and notifies PCI master 41 by using the serial data transfer. Before PCI master 41 ends a bus cycle as a bus master, the PCI device, i.e., a bus master, on internal PCI bus 2, to whom bus access is newly allowed, executes a transaction by which a device on external PCI bus 4 is specified as a target.

In this case, while PCI master 41 on external PCI bus 4 performs an operation as a bus master, since a conventional bridge connecting internal PCI bus 2 and external PCI bus 4 does not respond to a transaction from the bus master on internal PCI bus 2 and does not accept the transaction. However, if anything does not respond such as this case, a master abort is generated erroneously, regardless of an exiting target.

Under such situations, in accordance with one embodiment of present invention, EPBB 201 does not accept a transaction from the bus master on internal PCI bus 2 until a bus cycle on external PCI bus 4 ends. In addition, EPBB 201 generates a target retry on internal PCI bus 2, to prevent a master abort from being generated. If EPBB 201 notifies the bus master on internal PCI bus 2, which began the transaction on internal PCI bus 2, of the target retry, the bus master on internal PCI bus 2 can end the transaction normally. After a predetermined period has passed, the bus master on internal PCI bus 2 begins the same transaction again.

Since EPBB 201 activates TRDY#, STOP#, and DEVSEL# on internal PCI bus 2 as inactive, active, and active by way of the desk station bus, a target retry is notified to a present bus master on internal PCI bus 2.

Here, TRDY# is a signal to notify a target (selected device) to have completed a current data phase of a transaction and to have entered the state of ready. STOP# is a signal indicating that a current target is requesting a master to stop a current transaction. DEVSEL# is a signal indicating that a driving device has decoded its address as the target of the current access.

EIBB 202 receives through PCI-DS bridge 16 device memory cycles and I/O cycles generated by ISA DMAC 1521 on internal PCI bus 2, protocol-converts them, and sends them to external ISA bus 5. Further, where a bus access enable is granted to ISA master device 51 on external ISA bus 5, EIBB 202 generates an external ISA bus transaction on the desk station.

LBA 203 and EIDR 204 are provided to support DMA serial channel protocol.

LBA 203 monitors changes in the states of bus access requests REQ# from PCI bus master 41 on external PCI bus 4 and DREQ signals (basically of the amount of ISA DMA channels) from ISA master 51 on external ISA bus 5 and DMA slaves 52, 53, and sends the most recent state through PCI-DS bridge 16 device by serial transfer of a bit line by using a serial REQ# to RGM 1522.

The format of the bit string transmitted by a serial REQ# is as follows.

```
            s  0  1  2  3  4  5  6  7
REQ #       H, H, H, L, H, L, H, L, H, L, L, H, L, L, ...
```

LBA 203 takes the leading edge of the activated REQ# as the start bit (S), thereafter by using DMA channels 0 to 7 per each clock frame and sending them in series. The frame of channel 4 is used to send changes in the bus request state of PCI master 41, while all other channels are used to send changes in the states of DMA requests of ISA master 51 and DMA slaves 52, 53 on external ISA bus 5.

In each frame, "L" is taken to mean that there is no request and "H" is taken to mean that there is a request. In the above example, DREQs 0, 2 and 7 are active and correspond to a state where PCI master 41 on external PCI bus 4 is requesting bus access (DREQ 4 is active).

Two or more PCI bus masters can be connected to external PCI bus 4. In this case, if REQ#s from two or more PCI bus masters are output at the same time, LBA 203 performs the arbitration of access requests from respective PCI bus masters. LBA 203 accepts one of the REQ#s from PCI bus masters to use a serial data transfer.

When a serial GNT# is received from RGM 1522, LBA 203 decodes the bit string including the serial GNT# and either returns a DACK# to EIDR 204 or returns a GNT# on external PCI bus 4.

The format of the bit string transmitted by the serial GNT# from RGM 1522 is as follows.

```
            s  0  1  2
GNT #       H, H, H, L, L, L, H, L, ...
```

RGM 1522 takes the leading edge of the activated GNT# as the start bit (S). Thereafter, RGM 1522 allocates one bit per one clock frame, in sequence from the LSB, information 3-bit coded from one of the DMA channel DACK#s 0 to 7, and sends it in series. The code of channel 4 is used to send a GNT# corresponding to a bus request state of PCI master 41 on external PCI bus 4, while all other codes are used to send DACK#s corresponding to DMA requests of ISA master 51 and DMA slaves 53 on external ISA bus 5.

Under the above example, because the 3 bit form is "001", the code of channel is "4". DMA channel 4 would be selected. Hence, GNT# is granted to the requesting PCI bus master on external PCI bus 4. In this case, LBA 203 asserts GNT# on external PCI bus 4 corresponding to an accepted REQ#.

EIDR 204 changes mapped DMA channels into ISA master 51 and DMA slaves 52, 53 on external ISA bus 5, according to programmed mapping information. In cooperation with EIDR 204 and the previously described IIDR 1523, DMA channels can be exclusively allocated to devices on internal ISA bus 3 and devices on external ISA bus 5.

EIDR 204 changes the state of DREQ signals from each of ISA master 51 and DMA slaves 52, 53 to DREQ signals corresponding to the DMA channel numbers of these devices, according to mapping information, and sends them to LBA 203. Further, EIDR 204 changes DACK#s from LBA 203 into DACK#s actually used by ISA master 51 and DMA slaves 52, 53, according to mapping information, and outputs them to external ISA bus 5.

Figure 4:
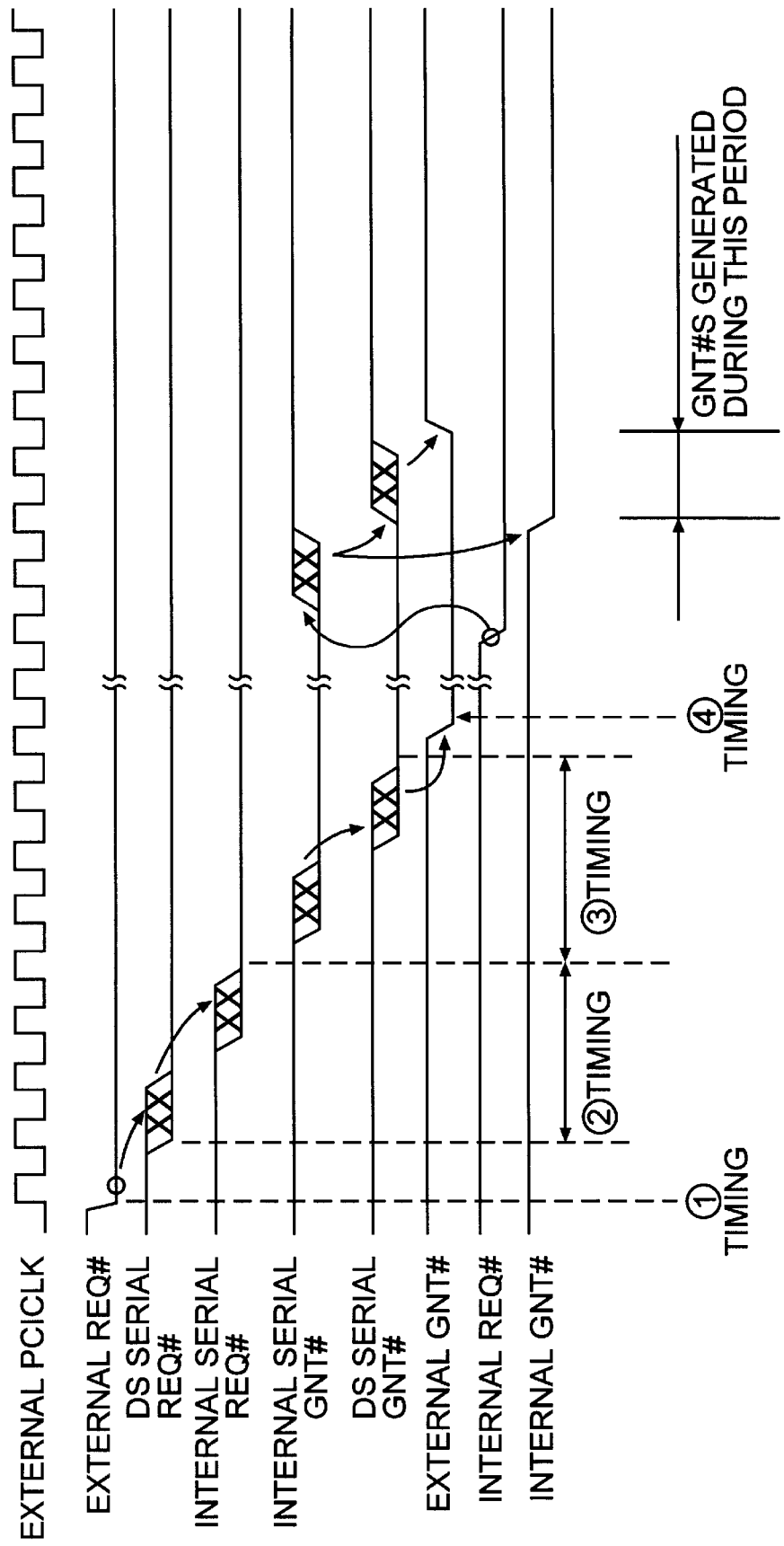
FIG. 4 is a timing chart for the system of FIG. 1 showing the switching operation of a PCI bus access enable on an internal PCI bus.

FIG. 4 shows the operation of EPBB 201 to prevent the above-mentioned master abort from being generating.

① PCI master 41 on external PCI bus 4 asserts a bus access request signal (external REQ#) allocated on PCI master 41 to access internal PCI bus 2.

② If LBA 203 receives the external REQ#, LBA 203 transmits it to RGM 1522 on the system board in a serial data transfer way by using serial REQ#. In this case, LBA 203 sends the request of the external REQ# as the DMA request of DMA channel 4 to RGM 1522 through PCI-DS bridge 16. Because the desk station bus and PCI-DS bridge 16 are located between LBA 203 and internal PCI bus 2, LBA 203 transmits the external REQ# as DS serial REQ on the desk station bus in synchronization with a clock (20–25 MHz) of the desk station bus, afterwhich PCI-DS bridge 16 transmits the DS serial REQ as a serial internal REQ to RGM 1522 on internal PCI bus 2 in synchronization with the clock (30–33 MHz) of internal PCI bus 2.

③ RGM 1522 takes the external REQ# out of the internal serial REQ, and inputs it to PBA 151. RGM 1522 waits for GNT# corresponding to the external REQ# to be allowed from PBA 151. When PBA 151 allows GNT# corresponding to the external REQ#, RGM 1522 transmits the GNT# to LBA 203 in the desk station in a serial data transfer way by using an internal serial GNT#. In this case, PCI-DS bridge 16 transmits the internal serial GNT# asserted by RGM 1522 as DS serial GNT# on the desk station bus in synchronization with a clock (20–25 MHz) of the desk station bus.

④ If LBA 203 detects that the GNT# corresponding to the external REQ# from the information transmitted by the DS serial GNT# was asserted, LBA 203 asserts the external GNT# allocated into PCI master 41 on external PCI bus 4.

Thus, PCI master 41 begins the transaction as a PCI bus master through the processing of these ①–④ steps.

When a PCI device on internal PCI bus 2, the priority of which is higher than that of PCI master 41, asserts an internal REQ# on internal PCI bus 2 during the transaction period of PCI master 41, PBA 151 deasserts the bus access enable signal GNT# corresponding to PCI master 41, and asserts the internal GNT# corresponding to the PCI device with high priority. If the bus access enable signal GNT# corresponding to PCI master 41 is deasserted, RGM 1522 informs LBA 203 of it in a serial transfer way by using serial GNT#. In this case, RGM 1522 outputs an internal serial GNT# onto internal PCI bus 2. Next, if PCI-DS bridge 16 receives the internal serial GNT#, it outputs the internal serial GNT# as a DS serial GNT# on the desk station bus in synchronization with the clock of the desk station bus.

LBA 203 decodes the serial information transmitted by the DS serial GNT#, and detects that the GNT# corresponding to the external REQ# is deasserted. LBA 203 deasserts an external GNT# corresponding to PCI master 41 on external PCI bus 4. When PCI master 41 recognizes that the external GNT# is deasserted, the transaction during the execution of PCI master 41 ends by executing a current cycle as a final cycle.

On the other hand, the PCI device on internal PCI bus 2, internal GNT# of which was asserted, asserts FRAME# to begin a transaction on internal PCI bus. It takes a lot of time for the external GNT# to become deasserted, as shown FIG. 6. Hence, there is a danger that two transactions collide from the point in time in which the internal GNT# of the PCI device on internal PCI bus is asserted up to which the external GNT# of PCI master on external PCI 4 is deasserted (i.e., the transaction of PCI master 41 ends).

Figure 5:
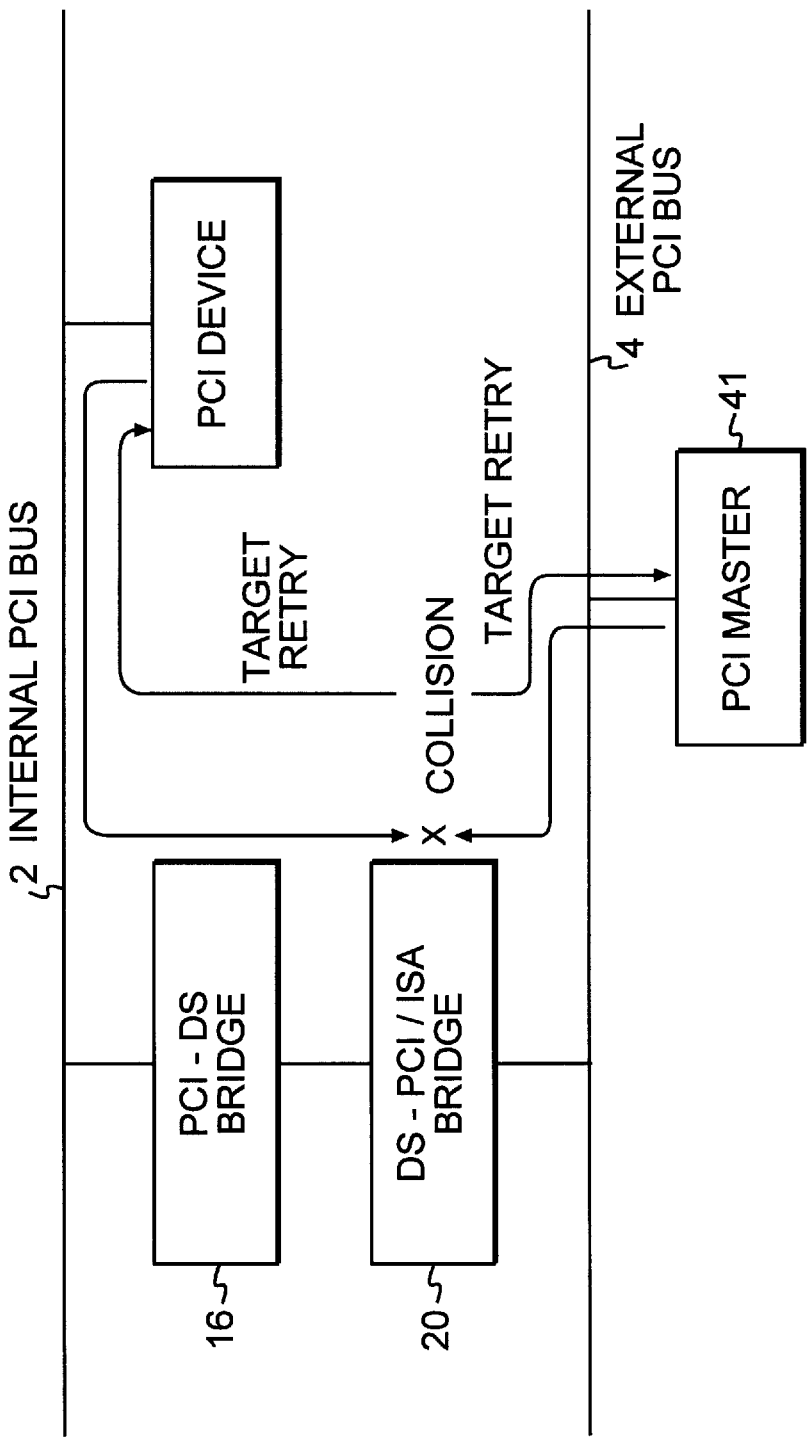
FIG. 5 illustrates the appearance of the collision of transactions and the generation of a target retry in the system of FIG. 1.

If the PCI device on internal PCI bus 2 targets an external PCI device on external PCI bus 4 specified by the transaction, as shown in FIG. 5, the transaction from the PCI device on internal PCI bus 2 and the transaction from the PCI device on external PCI bus 4 collide at DS-PCI/ISA bridge 20.

While PCI master 41 on external PCI bus 4 is executing a transaction as a bus master on internal PCI bus, if EPBB 201 implemented in DS-PCI/ISA bridge 20 recognizes that the PCI device on internal PCI bus 2 executes a transaction for an external PCI device on external PCI bus 4 as a target, that is, by decoding an address of the transaction output from the PCI device on internal PCI bus 2, EPBB 201 determines whether a current transaction on internal PCI bus 2 targets an external PCI device on external PCI bus 4, EPBB 201 does not transmit the transaction of the PCI device on internal PCI bus 2 onto external PCI bus 4.

Figure 6:
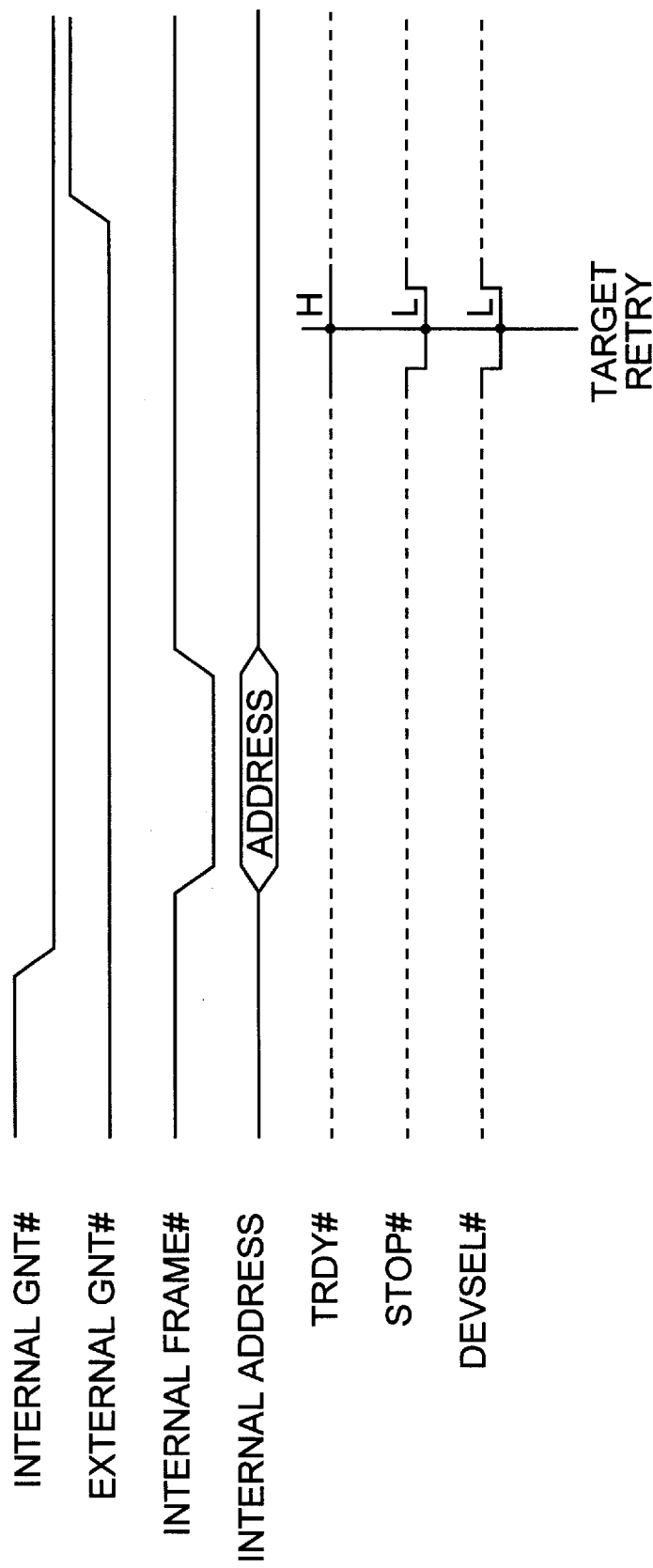
FIG. 6 is a timing chart for the DS-PCI/ISA bridge of FIG. 3 showing the notification operation of a target retry.

When the current transaction of the PCI device on internal PCI bus 2 targets an external PCI device on external PCI bus 4, EPBB 201 sets each of TRDY#, STOP#, and DEVSEL# signals on internal PCI bus 2 by way of the desk station bus and external PCI bus 4 as inactive, active, and active, respectively, to notify the PCI device on internal PCI bus 2 and the PCI master 41 on external PCI bus 4 of target retries as shown in FIGS. 5 and 6. The PCI device on internal PCI bus 2 and PCI master 41 external PCI bus 4, to which the target retries are notified respectively, completes the current transactions. After a predetermined period has been passed, the PCI device on internal PCI bus 2 and PCI master 41 on external PCI bus 4 retries the same transactions again. However, at this time, if PCI device 41 on external PCI bus 4 ends the transaction as a bus master, that is, PCI master 41 deasserts the external GNT# allocated thereon, only the PCI device on internal PCI bus 2 can normally access a target device on external PCI bus 4.

What is claimed is:

1. An apparatus for controlling the flow of transactions between a first bus and a second bus, the first bus being connected to a first target device and a first initiator device, the second bus being connected to a second target device and a second initiator device, the first initiator device having a higher priority than the second initiator device, comprising:

means for determining whether the first initiator device is allowed to use the first bus to access the second target device, when the second initiator device has been allowed to access the first target device;

means for transmitting a target retry to the first initiator device, when the second target device was specified as a target of a transaction of the first initiator device; and means for deasserting a bus access enable signal granted to the second initiator device, when the first initiator device is allowed to access the second target device.

2. The apparatus of claim 1, wherein each of the first and second buses is a PCI bus.

3. The apparatus of claim 2, further comprising:

means for decoding the transaction of the first initiator device; and means for determining whether the second target device was specified as a target by a transaction of the first initiator device.

4. The apparatus of claim 3, further comprising:

bus arbiter means, coupled to the first bus, for arbitrating bus accesses by using a pair of a bus access request signal and a bus access enable signal allocated to each device on the first bus;

means for transmitting a bus access request signal from the second initiator device into the first bus; and means for receiving, from the bus arbiter means, a bus access enable signal corresponding to the bus access request signal to allow the second initiator device to access the first bus.

5. The apparatus of claim 4, wherein the transmitting means includes means for transmitting a bus access request signal from the second initiator device according to a serial data transfer protocol.

6. The apparatus of claim 5, wherein the receiving means includes means for receiving a bus access enable signal from the bus arbiter means according to a serial data transfer protocol.

7. The apparatus of claim 6, wherein the deasserting means includes:

means for determining whether a bus access enable signal corresponding to the second initiator device is deasserted; and means for informing the second initiator device to terminate access to the first target device, when the bus access enable signal has been deasserted.

8. The apparatus of claim 3, wherein the first initiator device includes means for terminating a current transaction in response to the notified target retry and for retrying the same transaction after a predetermined period has been elapsed.

9. The apparatus of claim 8, wherein the transmitting means includes means for deasserting target ready signals on the first bus, and for asserting stop signals and device selection signals on the first bus.

10. The apparatus of claim 9, wherein the transmitting means includes means for informing a target retry to the second initiator device.

11. The apparatus of claim 4, wherein the bus arbiter means includes means for programmably setting the priority of arbitration to each device on the first and second buses.

12. The apparatus of claim 11, wherein the second bus is an expansion bus in an expansion unit.

13. The apparatus of claim 6, further comprising request and grant manager means, coupled to the first bus and the bus arbiter means, for decomposing serial information transmitted from the second initiator device according to the serial data transfer protocol, and for inputting the decomposed serial information to the bus arbiter means by using a bus access request signal allocated to the bus arbiter means.

14. The apparatus of claim 13, wherein the request and grant manager means includes means for receiving a state of bus access from the bus arbiter means by using a bus access enable signal allocated to the bus arbiter means, and for transmitting the state of bus access from the bus arbiter means in the serial data transfer protocol by using a bus access enable signal line.

15. A method of controlling a transaction in a computer system having a bridge coupled to a first bus and a second bus, the system including a first initiator device and a first target device coupled to the first bus and a second initiator device and a second target device coupled to the second bus, the first initiator device having a higher priority than the second initiator device, the method comprising the steps of:

determining whether the first initiator device is allowed to access the first bus, when the second initiator device has been allowed to access the first target device;

transmitting a target retry from the bridge to the first initiator device, when the second target device is specified as a target of a transaction of the first initiator device, in response to the determining step; and deasserting a bus access enable signal granted to the second initiator device, when the first initiator device is allowed to access the first bus.

16. The method of claim 15, further comprising the step of decoding a transaction of the first initiator device to determine whether the first initiator device is allowed to access the second target device.

17. The method of claim 16, wherein the transmitting step includes a step of transmitting a target retry from the bridge to the second initiator device.

18. The method of claim 16, further comprising the step of terminating the transaction of the first initiator device after the transmitting step.

19. The method of claim 16, further comprising the step of terminating the transaction of the second initiator device after the deasserting step.

20. The method of claim 18, further comprising the step of retrying the same transaction of the first initiator device after a predetermined time has elapsed.

21. The method of claim 16, wherein the transmitting step includes the step of deasserting a target ready signal (TRDY#) on the first bus and for asserting a stop signal (STOP#) and a device selection signal (DEVSEL#) on the first bus.

22. The method of claim 15, wherein the computer system includes bus arbiter means, coupled to the first bus, for arbitrating bus accesses on the first bus, and further comprising the steps of:
   transmitting a bus access request signal from the second initiator device to the bus arbiter means through the bridge;
   receiving a bus access enable signal from the bus arbiter means to allow the second initiator device to access the first target device;
   transmitting a bus access request signal from the first initiator device to the bus arbiter means; and
   receiving a bus access enable signal from the bus arbiter means to allow the first initiator device to access the second target device.

23. The method of claim 22, further comprising the step of commencing a transaction in order for the second initiator device to access the first target device after the first receiving step.

24. An apparatus for controlling transactions in a system having a first bus, a second bus, a first agent coupled to the first bus, a second agent coupled to the second bus, a first target device coupled to the first bus, and a second target device coupled to the second bus, the first agent having a higher priority than the second agent, comprising:
   bus arbiter means, coupled to the first bus, for arbitrating bus accesses by transmitting bus access request signals and corresponding bus access enable signals to devices on the first bus;
   bridge means, coupled to the first bus and the second bus, for transmitting a bus access request signal from the second agent to the bus arbiter means on the first bus and for receiving, from the bus arbiter means, a bus access enable signal corresponding to the bus access request signal to allow the second agent to access the first bus;
   means, coupled to the first bus and the second bus, for determining whether the first agent transmits a transaction to the second target device before the second device completes a transaction in which the first target device has been accessed;
   means, responsive to the determining means, for transmitting a target retry to the first agent when it is determined that the first agent transmits a transaction to the second target device;
   means for determining whether a bus access enable signal corresponding to the second agent is deasserted; and
   means for terminating the second agent's access to the first target device, when the bus access enable signal is deasserted.

25. The apparatus according to claim 24, wherein the first bus and the second bus each comprises a PCI bus.

26. The apparatus according to claim 24, wherein the transmitting means includes means for deasserting target ready signals on the first bus and for asserting stop signals and device selection signals on the first bus.

27. The apparatus according to claim 26, wherein the transmitting means includes means for transmitting a target retry to the second agent.

28. The apparatus according to claim 24, further comprising request and grant manager means, coupled to the first bus and the bus arbiter means, for decomposing serial information transmitted from the second agent and for inputting the decomposed serial information to the bus arbiter means using a bus access request signal.

29. A method of controlling transactions between a first bus and a second bus via a bridge, comprising the steps of:
   arbitrating bus accesses by transmitting bus access request signals and corresponding bus access enable signals to devices on the first bus;
   first transmitting a bus access request signal from the second agent to the first bus;
   first determining that a first agent coupled to the first bus has a higher priority than a second agent coupled to the second bus;
   receiving a bus access enable signal corresponding to the bus access request signal to allow the second agent to access the first bus;
   second determining whether the first agent has initiated a transaction for execution by a second target device coupled to the second bus, before the second agent completes a transaction in which a first target device coupled to the first bus has been accessed;
   second transmitting a target retry to the first agent when the first agent has initiated a transaction for execution by the second target device;
   third determining whether a bus access enable signal corresponding to the second agent is deasserted; and
   terminating the second agent's access to the first target device, when the bus access enable signal is deasserted.

30. The method according to claim 29, wherein the first bus and the second bus each comprises a PCI bus.

31. The method according to claim 29, wherein the second transmitting step comprises the step of deasserting target ready signals on the first bus and for asserting stop signals and device selection signals on the first bus.

32. The method according to claim 31, wherein the second transmitting step includes the step of transmitting a target retry to the, second agent.

33. The method according to claim 29, further comprising the steps of decomposing serial information transmitted from the second agent and inputting the decomposed serial information using a bus access request signal.

* * * * *